United States Patent [19]
Lee et al.

[11] 3,893,449
[45] July 8, 1975

[54] REFERENCE APPARATUS FOR MEDICAL ULTRASONIC TRANSDUCER

[75] Inventors: Robert D. Lee, San Mateo; Robert J. Hudock; Dale I. Shute, both of San Jose, all of Calif.

[73] Assignee: The United States of America as represented by the United States National Aeronautics and Space Administration, Washington, D.C.

[22] Filed: Dec. 21, 1973

[21] Appl. No.: 427,395

[52] U.S. Cl. ........ 128/2 V; 74/471 XY; 128/2.05 Z; 128/24 A
[51] Int. Cl. ............................................ A61b 10/00
[58] Field of Search ............. 128/2 V, 2.05 Z, 24 A; 74/501 M, 471 XY

[56] References Cited
UNITED STATES PATENTS

| | | | |
|---|---|---|---|
| 1,987,733 | 1/1935 | Fonbrune | 74/471 XY X |
| 2,762,234 | 9/1956 | Dodd | 74/471 XY |
| 2,787,746 | 4/1957 | Redmond | 74/471 XY |
| 2,988,928 | 6/1961 | Fonbrune et al. | 74/471 XY |
| 3,135,263 | 6/1964 | Connelley, Jr. | 74/471 XY X |
| 3,237,623 | 3/1966 | Gordon | 128/24 A |
| 3,247,709 | 4/1966 | Gordon | 128/2 V |
| 3,253,481 | 5/1966 | Warhol | 74/471 XY X |
| 3,365,975 | 1/1968 | Hathaway | 74/471 XY |
| 3,777,740 | 12/1973 | Hokanson | 128/2 V |
| 3,779,234 | 12/1973 | Eggleton et al. | 128/2 V |

OTHER PUBLICATIONS
Hudson, A. C. et al., *The Journ. of the Acoustical Soc. of Amer.*, November, 1968, Vol. 44, No. 5, pp. 1353–1358.

Primary Examiner—Kyle L. Howell
Attorney, Agent, or Firm—Darrell G. Brekke; Armand G. Morin, Sr.; John R. Manning

[57] ABSTRACT

A portable miniature ultrasonic transducer positioning apparatus is described having a transducer receiving sleeve coupled to a pair of orthogonally orientated, independently pivotable yokes. The yokes are pivotably mounted to a base member the under surface of which is fitted with a non-skid rubber cap. A pair of potentiometers are coupled to the axes of the yokes and to a dual meter sleeve position indicator for indicating, with respect to the axes of the yokes, the angular position of a probe slidably fitted in the sleeve. An oscilloscope or similar signal display device is coupled to the probe for providing signal readout from the probe for use in ultrasonic cardiology oscilloscope studies. As an option, a ball lever assembly is further provided coupled to the yokes by means of a four-wire cable and wheel assembly for remotely controlling yoke position and the angular position of the sleeve and a probe fitted therein. An emplacement of indelible marks on a patient's chest corresponding to index marks on the base member, permit, with the use of previously obtained position information from the indicator, accurate positioning of the apparatus during subsequent examinations.

5 Claims, 11 Drawing Figures

REFERENCE APPARATUS FOR MEDICAL ULTRASONIC TRANSDUCER

The invention described herein was made by employees of the U.S. Government and may be manufactured and used by or for the Government for governmental purposes without the payment of any royalties thereon or therefor.

BACKGROUND OF THE INVENTION

The present invention is directed to a transducer positioning apparatus system in general and, more particularly, to an ultrasonic transducer positioning apparatus with means for recording the position of a transducer probe.

The apparatus, while suitable for use in a variety of medical procedures, is considered particularly suitable for use in the diagnosis, treatment and study of the heart and heart conditions by cardiologists.

With conventional apparatus and known procedures using an ultrasonic transducer, the present method for locating a specific area of the heart and associated vascular system is by trial and observation using an ultrasonic transducer probe which is required to be hand held during the examination or reexamination while observing signals displayed on an ultrasonic cardiology oscilloscope.

During initial examinations, conventional methods and apparatus are found to be time consuming, burdensome and tedious to use, in that conventional probes have to be hand held. They are burdensome and tedious to use since one or both of the physician's hands are continually occupied in holding the probe, making equipment adjustments and necessary notes on the observations made. If an observation at a particular point over a length of time is desired, the physician, or at least an assistant, is required to hold the probe steady during the period so as not to adversely affect the observations.

In the event of a re-examination of a particular person, there is no known apparatus or procedure readily available for use by cardiologists in their offices or hospitals for duplicating the probe orientations used during a previous examination. This is an obvious disadvantage especially when it is desired to observe the status or change in condition of a person under substantially identical conditions to those which previously existed.

The reason for the present situation is that existing laboratory equipment which is available for performing similar functions is too large and is generally not adaptable to accept ultrasonic transducer probes of the sizes now desired and used by cardiologists in their offices and hospitals. Moreover, there is presently no known portable miniature transducer positioning apparatus with means for providing remote control positioning of a probe.

SUMMARY OF THE INVENTION

In view of the foregoing, a principal object of the present invention is a portable miniature ultrasonic transducer positioning apparatus with means for identifying the position of a transducer emplaced on a patient's chest.

As a feature of the invention, there is provided a transducer or probe receiving sleeve which is coupled to a pair of orthogonally orientated yokes. The yokes are pivotably mounted to a base member. A potentiometer is coupled to an axis of each of the yokes. As the yokes are rotated, the degree of rotation is detected by the appropriate potentiometer, which unbalances a resistance bridge for registering probe position on one or both meters of a dual meter probe position indicator.

For remote control of probe position, a lever assembly is further coupled to the yokes by means of a control cable and a pair of wheels coupled to the axis of the yokes. The lever assembly is in the nature of a "joystick" which serves to impart rotational motion to the yokes in response to a movement of the joy-stick.

Readings from the probe are taken on an ultrasonic cardiology oscilloscope coupled to the probe.

For re-examination of a patient, indelible marks are placed on a patient's chest in registration with indices on the apparatus. These marks, together with a set of previously obtained position readings from the probe position indicator, permit subsequent repositioning of the apparatus with a high degree of accuracy.

Since the apparatus of the present invention reduces the time required to examine a patient, permits re-examination under pre-existing instrument conditions, and is portable, there is saved in its use a considerable amount in time and expense heretofore required by the use of large laboratory equipment.

DESCRIPTION OF THE DRAWINGS

The foregoing and other objects, features and advantages of the present invention will be apparent from the following detailed description of the accompanying drawings in which.

DETAILED DESCRIPTION

The transducer positioning apparatus of the present invention is described herein in terms of a medical electromechanical system comprising means for receiving, positioning, and identifying the position of an ultrasonic transducer probe for use by cardiologists in the diagnosis and treatment of cardiac conditions. There is also described a means for remotely positioning the probe.

Figure 1:
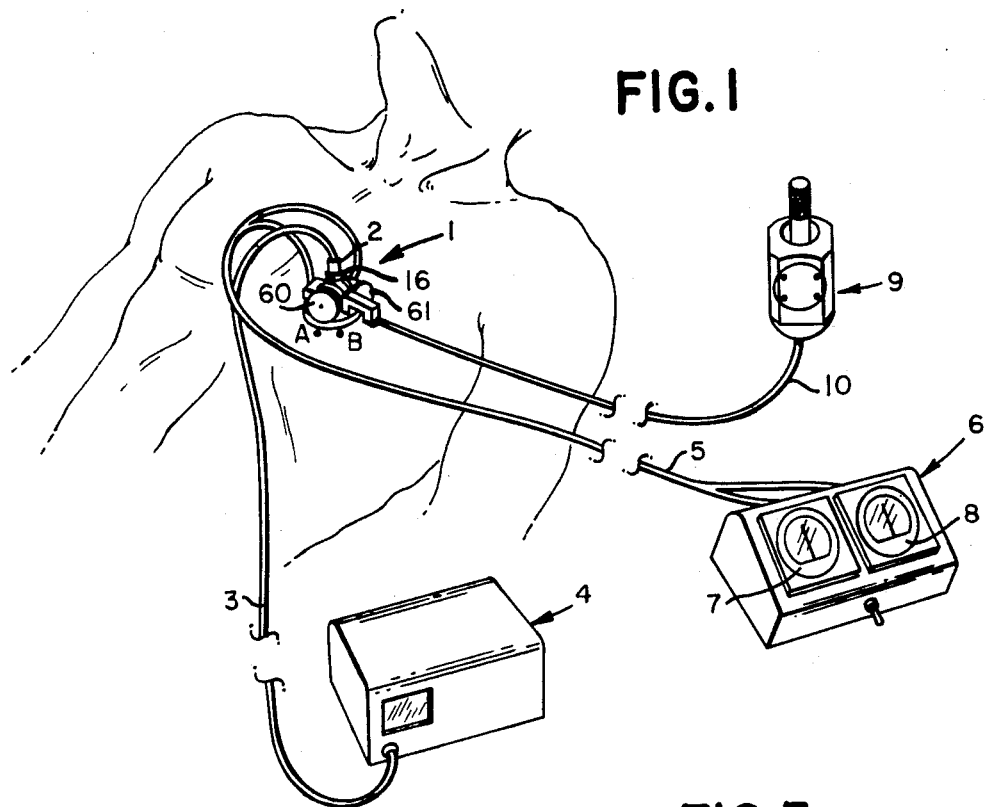
FIG. 1 is a perspective view of a system in accordance with the present invention.

Referring to FIG. 1, the system comprises a probe holder assembly 1 in a typical emplacement on the chest of a patient. The assembly 1 is provided with means for receiving and positioning an ultrasonic probe 2. Probe 2 is coupled, by means of a signal cable 3, to an ultrasonic cardiology oscilloscope 4 or other suitable signal display and recording apparatus for registering the output signals generated by the probe. Coupled to probe holder assembly 1 by means of a signal cable 5 is a probe position indicator 6. Indicator 6 is provided with a pair of meters 7 and 8, identified as X- and Y-meters. Meters 7 and 8 identify the position of the probe 2 with respect to a pair of orthogonal axes about which the probe 2 is pivoted.

As will be apparent, probe 2 may be pivoted, its positions noted on meters 7 and 8 and observations made with oscilloscope 6 by simply grasping and pivoting the probe or an appropriate part of the holder assembly 1. Alternatively, the position of probe 2 may be remotely controlled by means of a lever assembly 9 coupled to assembly 1 by means of a control cable 10.

Figure 2:
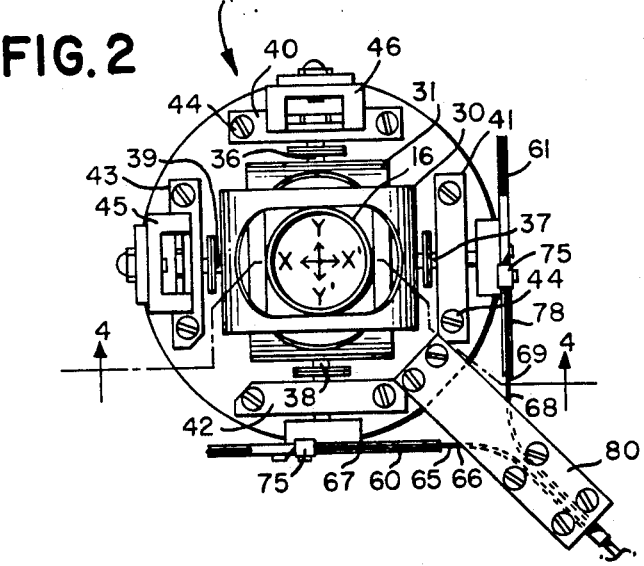
FIG. 2 is a plan view of the chest mounted probe position apparatus of FIG. 1.
Figure 3:
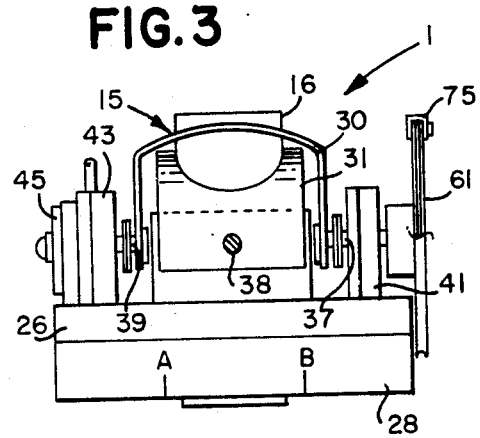
FIG. 3 is a partial front elevation view with the remote control wheel, associated bearing block and control cable block omitted for clarity.
Figure 4:
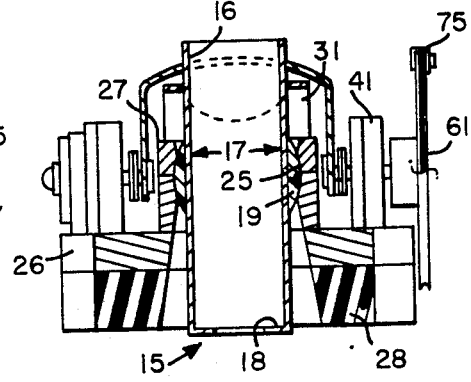
FIG. 4 is a cross-sectional view taken along lines 4—4 of FIG. 2.

As shown in more detail in FIGS. 2, 3 and 4, probe holder assembly 1, shown sans probe 2, comprises a ball joint probe holder 15 consisting of a hollow cylindrically shaped tube or sleeve 16 having an inner diameter 17 approximately equal to the outer diameter of commercially available ultrasonic transducer probes. At the lower end of sleeve 16 there is provided an inwardly directed ridge or shoulder 18. Shoulder 18 serves to receive a probe and prevent its dropping out of the sleeve 16.

In use, an appropriate probe is slidably fitted in the interior of sleeve 16 and coupled to an oscilloscope as shown in FIG. 1.

Immediately above the lower end of sleeve 16 there is provided an outwardly extended ball-shaped surface or member 19. Member 19 serves as a ball joint and typically comprises a low-friction material which is melted on or otherwise fixed to the outer surface of the sleeve 16. Alternatively, the ball joint may be made as an integral part of the sleeve 16 during its fabrication.

The lower end of sleeve 16 and, more specifically, the ball joint 19 of sleeve 16, is removably rotatably secured in a spherically shaped seat 25 provided in an assembly 26 which serves as the base of the assembly 1 by means of a retainer cap 27. Cap 27 is removably secured to base member 26 as by screws, not shown. Fitted to the lower surface of base member 26 there is provided a rubber cap, or the like, 28. Cap 28 comprises a high-friction material and is typically provided with a plurality of concentric ridges and grooves (not shown) for preventing the apparatus 1 from sliding around on a patient's chest. The lower end of sleeve 16 is further provided to extend slightly beyond the cap 28 to insure contact of the sleeve and the closest proximity of the probe in the sleeve to the patient's chest consistent with procedural requirements and patient comfort.

Figure 5:
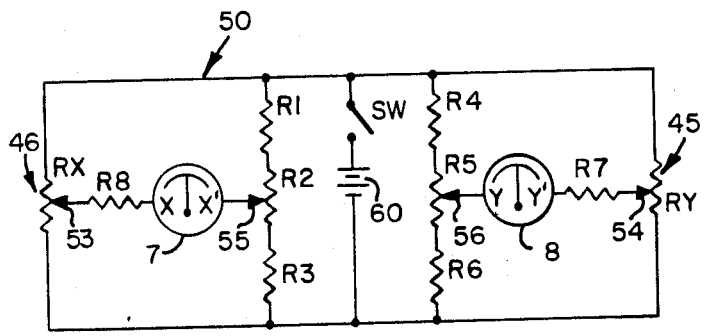
FIG. 5 is a schematic diagram of the position indicator of FIG. 1.

To provide for positioning of the sleeve 16 and for maintaining a probe held therein in a given position, there is provided a pair of U-shaped yokes 30 and 31. Yokes 30 and 31 are pivotably mounted in an orthogonal overlapping fashion as by pin assemblies 36, 37, 38 and 39 to base member 26 by means of a plurality of bearing blocks 40, 41, 42 and 43. Blocks 40–43 are removably secured to base member 26 in any suitable manner, such as by screws 44. One leg of each of yokes 30 and 31 is further mechanically coupled respectively to the center wipers 53 and 54, as shown in FIG. 5, of a pair of potentiometers 45 and 46, which are respectively mounted to bearing blocks 43 and 40. Potentiometers 45 and 46 are part of the indicator 6 and serve to provide probe position information to operate the indicator.

Referring to FIG. 5, indicator 6 comprises a pair of resistance bridges 50 and 51. Bridge 50, containing X-meter 7, is conveniently called the X-bridge. Bridge 51, containing Y-meter 8, is conveniently called the Y-bridge. A first leg of X-meter 7 is coupled, by means of a wiper 55, to a resistor R2 of a voltage divider comprising a plurality of resistors R1, R2 and R3. A second leg of X-meter 7 is electrically coupled to the center wiper 53 of the potentiometer 46, conveniently designated $R_x$, through a resistor R8. Resistor R8 is a sensitivity resistor, the value of which is chosen to provide full scale deflection of X-meter 7 for maximum displacement of sleeve 16 and yoke 31 in directions X–X' or X'–X, as shown by the X–Y coordinates depicted within sleeve 16 of FIG. 2. Wiper 55, in cooperation with resistor R2, is provided for centering X-meter 7 when sleeve 16 and yoke 31 are vertical or centered with respect to base member 26.

In like fashion, a first leg of Y-meter 8 is coupled, by means of wiper 56, to a resistor R5 of a voltage divider comprising a plurality of resistors R4, R5 and R6. A second leg of Y-meter 8 is electrically coupled to the center wiper 54 of the potentiometer 45, conveniently designated $R_y$, through a resistor R7. Resistor R7 is a sensitivity resistor, the value of which is chosen to provide full-scale deflection of Y-meter 8 for maximum displacement of sleeve 16 and yoke 30 in directions Y–Y' or Y'–Y as shown by the X–Y coordinates depicted within sleeve 16 in FIG. 2. Wiper 56, in cooperation with resistor R5, is provided for centering Y-meter 8 when sleeve 16 and yoke 30 are vertical or centered with respect to base member 26.

To power indicator 6, a series-coupled battery 60 and switch Sw are coupled in parallel with bridges 50 and 51. The battery current drain is minimized through the use of high impedance resistances. As is apparent, movement of sleeve 16 and yoke 30 in direction Y–Y' or Y'–Y will cause Y-yoke 30 to pivot about pins 37 and 39 in bearing blocks 43 and 44. The rotation of yoke 30 will move wiper 54 of potentiometer 45, unbalancing Y-bridge 51 and causing the meter movement of Y-meter 8 to be displaced in a Y–Y' or Y'–Y direction. Likewise, a movement of sleeve 16 and yoke 30 in direction X–X' or X'–X will cause X-yoke 31 to pivot about pins 36 and 38. The rotation of yoke 31 will move wiper 53 of potentiometer 46, unbalancing X-bridge 50 and causing the meter movement of X-meter 7 to be displaced in a X–X' or X'–X direction depending on the direction of rotation of the yoke 31.

Since yokes 30 and 31 may be rotated independently and in either one of two directions from a centered or zero displacement position, it is found convenient to mark the meter scale of X- and Y-meters 7 and 8 accordingly. For this purpose, each of the meter scales of meters 7 and 8 may be marked in an appropriate scale from 01–10 with 01 appearing at the far left of the meter scale. Thus, an angular position will be indicated on X-meter 7 as two digits 01 through 10, and on the Y-meter 8 as two digits 01 through 10. On a chart of the meter readings, the first sequence of two digits will always indicate a position with respect to movement of yoke 31 in direction X–X' and the second sequence of two digits will always indicate a position with respect to movement of yoke 30 in direction Y–Y'.

In use, probe holder assembly 1 is emplaced on a patient's chest over the heart as shown in FIG. 1. The assembly 1 is secured in place by hand or, as is often more convenient, by an elastic bandage (not shown) fitted with a hole large enough to fit over the yokes 30 and 31 so as not to interfere in their operation. The ends of the bandage are fitted with hooks or other fastening means and secured at the patient's back. The cardiologist then adjusts the position of the probe by moving the sleeve 16 and yokes 30 and 31 for the desired cardiac signals on the ultrasonic cardiology oscilloscope. With the assembly 1 and probe 2 in the desired location, a pair of indelible marks A and B, corresponding to a pair of marks A and B on the side of base member 26, as shown in FIG. 3, are placed on the patient's chest and one or more sets of meter readings noted on the indicator 6. When the patient is re-examined at a later time, it is then a simple matter, by means of the present invention, to relocate assembly 1 on the patient's chest and reposition the probe 2 using the mark A and B and previous meter readings. There is thus provided by means of the present invention a miniature device that can be used to quickly locate a specific area of the heart transcutaneously when provided with two meter readings and the indexing marks on a patient's chest. The device also permits such a re-examination to be conducted by a person other than the original examiner with a high degree of confidence that the observations made on the oscilloscope will not be in error.

As previously described with respect to FIG. 1, to vary the position of the probe holder assembly 1 from a point remote from the assembly 1, there is provided a manually operable lever assembly 9. Assembly 9 is coupled to assembly 1 by means of a four-wire cable 10.

Figure 11:
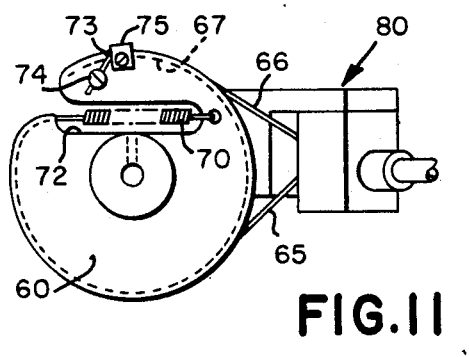
FIG. 11 is a detail side elevation view of the cable wheel and cable control block of FIG. 2.

Referring to FIGS. 2 and 11, coupling of the four-wire cable 10 to assembly 1 is provided by means of a wheel 60 coupled to pin 38 extending through bearing block 42 from yoke 31 and a wheel 61 coupled to pin 37 extending through bearing block 41 from yoke 30. The arrangement of the wires of cable 10 and wheels 60 and 61 are substantially identical and therefore only wheel 60 and its coupling to a pair of wires 65 and 66 of cable 10 is described in detail.

The two wires 65 and 66 of cable 10 are threaded in opposite directions about the wheel 60 in a groove 67 provided in the periphery of the wheel 60. Similarly, two wires 68 and 69 of cable 10 are threaded in opposite directions about the wheel 61 in a groove 78 provided in the periphery of the wheel 61. As seen in FIG. 11, wires 65 and 68 are coupled to their respective wheels 60 and 61 by means of a pair of springs 70 provided in a pair of slots 72 in the body of the wheels. Conversely, wires 66 and 69 are extended about and over the rim of their respective wheels 60 and 61 and are secured to the wheels by means of a pair of screws and clips 74 and 75. Each pair of wires associated with wheels 60 and 61 thus provide for clockwise and counter-clockwise rotation of the wheels.

The four wires 65, 66, 68 and 69 extend from the wheels 60 and 61 through a cable block 80 mounted in cantilever fashion to base member 26 to the lever assembly 9.

Figure 9:
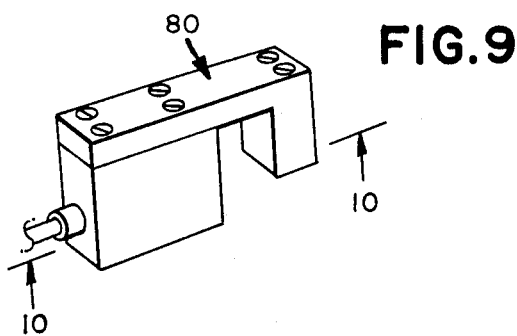
FIG. 9 is a perspective view of the control cable block of FIG. 2.
Figure 10:
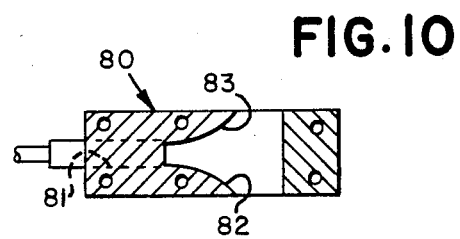
FIG. 10 is a cross-section view taken along lines 10—10 of FIG. 9.

As seen in FIGS. 9 and 10, cable block 80 is provided with a hole 81 and a pair of arcuate wall members 82 and 83 the surfaces of which serve as guides for the wires 65, 66, 68 and 69.

Figure 6:
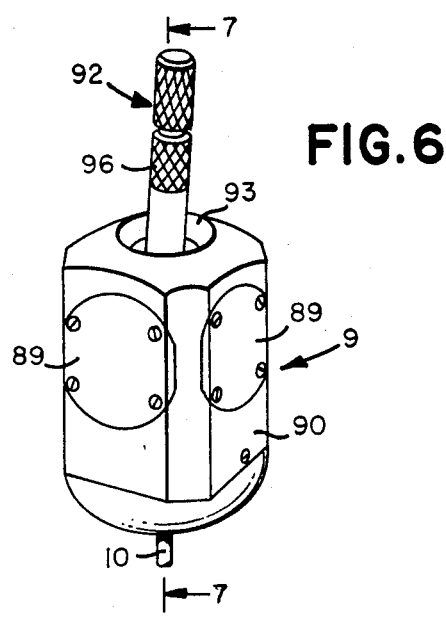
FIG. 6 is a perspective view of the lever assembly of the present invention.
Figure 8:
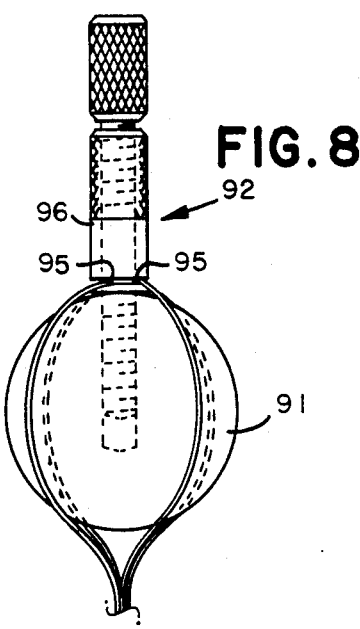
FIG. 8 is a detail of the ball control mechanism of FIG. 7.
Figure 7:
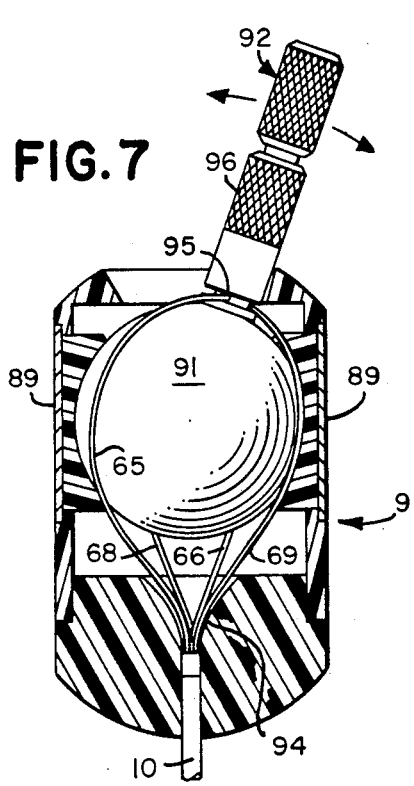
FIG. 7 is a cross-sectional view taken along lines 7—7 of FIG. 6.

Referring to FIGS. 6, 7 and 8, lever assembly 9 comprises a housing 90 within which is rotatably fitted and secured by means of a plurality of access plates 89, a spherical ball 91 of low-friction material. The interior of plates 89 are provided with a spherical surface corresponding to the surface of the ball 91. The ball 91 is fitted with a lever member or "joy-stick" 92 which extends through a hole 93 provided therefor in the top of housing 90. Wires 65, 66, 68 and 69, running from assembly 1, are threaded into housing 90 through a hole 94 provided therefor in the bottom of housing 90. From the hole 94, the wires 65, 66, 68 and 69 are passed over the surface of the ball 91 at equidistantly spaced locations about the surface of the ball and threaded through a pair of holes 95 provided therefor in the base of lever member 92 near the top of the ball 91.

To provide a means for centering the lever member 92 when yokes 30 and 31 are centered, wires 65, 66, 68 and 69 are simply passed through holes 95 and threaded to and from wheels 60 and 61 without being fixedly attached to the lever member 92 or ball 91. When the yokes 30 and 31 and lever member 92 are centered, a knurled knob 96, provided on lever member 92, is screwed down to clamp wires 65, 66, 68 and 69 in a fixed position with respect to the lever member 92 and ball 91. Conversely, if a further adjustment of lever member 92 is required, the knurled knob 96 may be loosened and the lever member 92 and ball 91 moved without moving the wires 65, 66, 68 and 69 as the wires are then permitted to pass freely through the hole 95.

As seen more clearly in FIG. 7, when assembled, wires 65, 66, 68 and 69 are held in their respective positions on the surface of ball 91 in the corners of housing 90 by means of the access plates 89. Since the respective wires of each pair of wires 65, 66, and 68, 69 are threaded along diametrically opposed lines on the surface of ball 91, movement of the lever member 92 will impart equal and opposite forces to the opposing wires and thus provide the control necessary for moving wheels 60 and 61.

It is understood that various modifications and changes may be made in the various features of the invention as illustrated without departing from the spirit and scope of the present invention. Accordingly, the embodiments described are to be taken only as illustrative and the invention considered as broadly as the following claims will permit.

What is claimed is:

1. A transducer positioning apparatus comprising:
   a base member with an aperture therethrough;
   an elongated transducer receiving sleeve;
   a ball joint including a seat, and a ball with a channel therethrough, said seat being fastened to said base member around the periphery of said aperture, said sleeve being secured about its midsection to the channel wall of said ball whereby said sleeve may swivel in two orthogonal directions about a point inside said sleeve;
   first and second U-shaped yokes each having a slotted midsection, said slotted midsections being located over said aperture;
   means for pivotably mounting the extremities of said yokes to said base member so that said yokes are orthogonally disposed to each other and said sleeve slidably engages the slotted midsection of each yoke;

means coupled to said yokes for remotely moving said yokes; and means for remotely indicating the orientation of said transducer receiving sleeve with respect to said base member.

2. A transducer positioning apparatus comprising:

a base member with an aperture therein;

a spherically-shaped seat attached to said base member and encircling said aperture;

an elongated transducer receiving sleeve with a ring member fastened about it, the outer surface of said ring member being spherical, said ring member being rotatably secured by said seat whereby said sleeve and said ring member may pivot in two orthogonal directions about a point within said sleeve;

first and second U-shaped yokes each having two arms and a slotted midsection, first means for pivotably mounting each arm of said first yoke to said base member, second means for pivotably mounting each arm of said second yoke to said base member so that said yokes are orthogonal and said sleeve slidably engages both of said slots;

means coupled to said yokes for remotely moving said yokes; and means for remotely indicating the orientation of said transducer sleeve with respect to said base member.

3. Transducer positioning apparatus as set forth in claim 2 wherein said moving means comprises:

a first wheel coupled to said first yoke near the mounting means for one of said yoke arms;

a second wheel coupled to said second yoke near the mounting means for one of said yoke arms;

a housing;

a spherical member rotatably secured within said housing;

a lever member fastened to said spherical member;

first, second, third and fourth wires;

a block with five passages therein attached to said base member;

a sheath for containing said four wires extending from said housing to said block;

said first and second wires each coupled between said first wheel and said lever member, said third and fourth wires each coupled between said second wheel and said lever member, all of said wires passing over said spherical member before reaching said lever member and said wires being equidistantly spaced on said spherical member whereby lever member motion is transmitted from said wires to said wheels to said yokes and finally to said transducer sleeve.

4. Transducer positioning apparatus as set forth in claim 3 wherein said indicating means comprises:

first and second potentiometers secured to said base member, each of said potentiometers having a shaft, said first potentiometer shaft being coupled to said first yoke, said second potentiometer shaft being coupled to said second wheel;

a resistance bridge circuit utilizing said first and second potentiometers, said bridge circuit having first and second meters, said first meter indicating the orientation of said sleeve with respect to a first degree of freedom and said second meter indicating said orientation of said sleeve with respect to a second degree of freedom orthogonal to said first degree of freedom.

5. Transducer positioning apparatus as described in claim 4 wherein a line drawn through the arm pivots of said first yoke passes through said point and a line drawn through the arm pivots of said second yoke also passes through said point.

* * * * *